Nov. 9, 1926.  
D. MIDDLEYARD ET AL  
1,606,256  
AUTOMATICALLY ACTING ARRESTING DEVICE FOR MINE TUBS AND LIKE VEHICLES  
Filed June 3, 1924

Patented Nov. 9, 1926.

1,606,256

UNITED STATES PATENT OFFICE.

DAVID MIDDLEYARD, ALBERT JAMES AUSTEN, AND WILBERFORCE MELVIN, OF SOUTH SHIELDS, ENGLAND.

AUTOMATICALLY-ACTING ARRESTING DEVICE FOR MINE TUBS AND LIKE VEHICLES.

Application filed June 3, 1924, Serial No. 717,587, and in Great Britain June 6, 1923.

This invention relates to means for arresting the movement of mine tubs, trams and like vehicles in the event of breakage of the haulage connections, of the kind in which a detent operatively connected with the draw hook of the vehicle automatically engages a toothed wheel on the axle.

It has previously been proposed to pivot at the rear end of a vehicle a pawl connected to a spring and to the sliding draw bar of the vehicle so that when the pull on the draw bar is relaxed the pawl engages a ratchet wheel on one of the axles so as to prevent movement in one direction.

According to our invention we provide a pair of pawls pivoted between the axles of the vehicle and each connected by a link to one of the draw hooks which are arranged to slide in slots in the centre bar of the truck, each pawl engaging a ratchet wheel on the adjacent axle of the vehicle so that when the pull on the hooks is relaxed, movement of the vehicle in both directions is prevented.

In the accompanying drawings—

Figure 1:
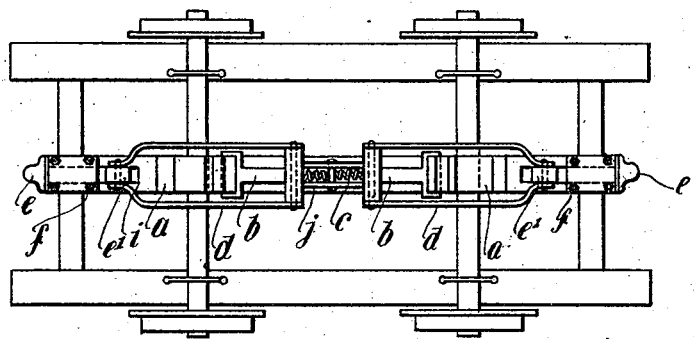
Fig. 1 is an underplan of a mine tub fitted with the invention.
Figure 4:
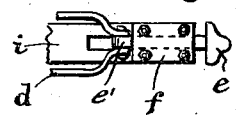
Fig. 4 is a detail plan of the center bar, one of the draw hooks and associated elements.
Figure 2:
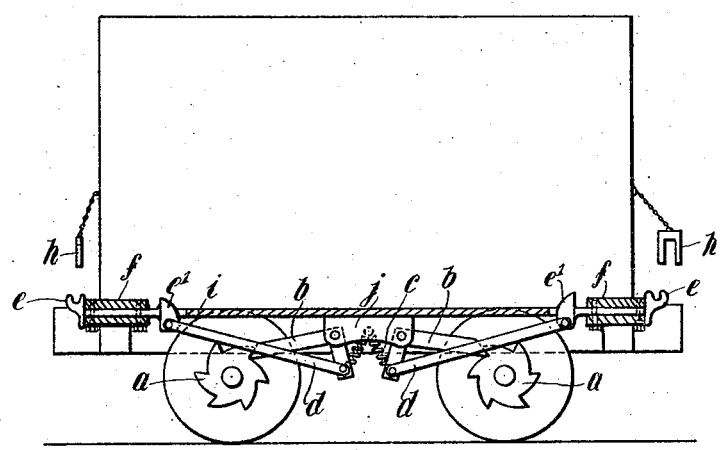
Fig. 2 is a side elevation with two of the wheels removed to show the brake mechanism in the locked position.
Figure 3:
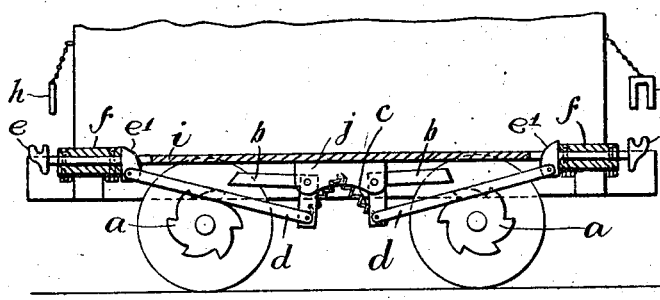
Fig. 3 is a fragmentary view similar to Fig. 2 but with the brake mechanism in the unlocked position.

In the drawings, $i$ is a centre bar fixed beneath the tub having its ends slotted or forked. $e$ are drawhooks extended into draw bars which are disposed to slide in the slotted ends of the centre bar, strengthening plates $f$ being bolted to the slotted ends of the centre bar. The inner ends of the draw bars are extended upwardly into stops $e^1$ for cooperation with the plates $f$ to transmit the hauling pull and downwardly into projections to which the ends of links or connecting bars $d$ are pivoted. One link $d$ comes on each side of these projections as shown in Fig. 1. $j$ are two downwardly projecting portions riveted or welded to the fixed centre bar in the ends of which are pivotally mounted right angled levers, the long arms of which form pawls $b$. To the short arms on each side the other ends of the links $d$ are pivoted. $a$ are ratchet wheels fixed to the rotary axles of the tub, the teeth on one ratchet being oppositely directed to those on the other. $c$ are tension springs extending between the projections $j$ and the short arms of the right angled levers to which they are connected by small bridles and tending to keep the pawls $b$ in engagement with the ratchet wheels.

Upon pulling outwardly one of the draw hooks $e$ it will be seen that the draw bar slides in the slotted end of the centre bar $i$ until the pull transmitting stop $e^1$ contacts with the plate $f$. This sliding action causes the two links $d$ pivoted to the underside of the draw bar to pull on the short arm of the associated right angled lever against the action of the spring $c$ and turn this lever about its pivot, which raises the particular pawl $b$ from engagement with its ratchet wheel $a$.

In hauling it will be realized that both drawhooks $e$ are pulled outwardly and that therefore both pawls $b$ are released from their ratchets $a$. Should the hauling rope break or the pull be released (in whichever direction the tub is being moved) both pawls $b$ would be brought into engagement with their ratchet wheels $a$ and one pawl would prevent movement in one direction while the other pawl prevents movement in the other direction. Thus the tub is absolutely locked till the haulage power is replaced. After a breakage, upon repair, when the haulage recommences, the first pull releases the pawls $b$ from the ratchets $a$ and the tubs are permitted to move. When the tub is disengaged on the level it can be run about out of gear by pulling out the hooks $e$ and inserting the distance shoes $h$ between the combined end formed by the centre bar and fish plates, and the back of the shoulder of the hook $e$.

In the case of the last car of the train the rear draw hook $e$ will be held in the outer position by the cooperating distance shoe $h$ to hold the associated pawl in raised position.

Having thus described the invention, what is claimed is:—

1. Braking means for mine tubs, trams and like vehicles comprising in combination two rotary axles having running wheels at each end thereof, a ratchet wheel on each axle, the ratchet wheel on one axle being oppositely directed to the ratchet wheel on the other axle, two separate spring controlled pawls one engaging each ratchet wheel, sliding draw hooks and draw bars at each end of the tub, and links between the draw bars and the pawls for the purposes set forth.

2. Braking means for mine tubs, trams and like vehicles comprising in combination two rotary axles having running wheels at each end thereof, a ratchet wheel on each axle, the ratchet wheel on one axle being oppositely directed to the ratchet wheel on the other axle, two pivoted spring controlled right angled levers one arm of each of which forms a pawl to engage one of said ratchet wheels, sliding draw hooks and draw bars at each end of the tub and links between the draw bars and the other arms of the right angled levers for the purposes set forth.

3. Braking means for mine tubs, trams and like vehicles comprising in combination two rotary axles having running wheels at each end thereof, a ratchet wheel on each axle, the ratchet wheel on one axle being oppositely directed to the ratchet wheel on the other axle, two pivoted spring controlled right angled levers one arm of each of which forms a pawl to engage one of said ratchet wheels, sliding draw hooks and draw bars at each end of the tub, links between the draw bars and the other arms of the right angled levers, and stops on the draw bars adapted to abut against fixed parts of the tub for the purposes set forth.

4. Braking means for mine tubs, trams and like vehicles comprising in combination two rotary axles having running wheels at each end thereof, a ratchet wheel on each axle, the ratchet wheel on one axle being oppositely directed to the ratchet wheel on the other axle, a centre bar fixed beneath the tub and having forked ends, two spring controlled right angled levers, pivoted to the centre bar, one arm of each of which forms a pawl to engage one of said ratchet wheels, sliding draw hooks and draw bars at each end of the tub, the draw bars sliding in the forked ends of the centre bar, links between the draw bars and the other arms of the right angled levers, stops on the draw bars and fish plates joining the forked ends of the centre bars against which the said stops are adapted to take for the purposes set forth.

In testimony whereof we affix our signatures.

DAVID MIDDLEYARD.
ALBERT JAMES AUSTEN.
WILBERFORCE MELVIN.